Figure 1:
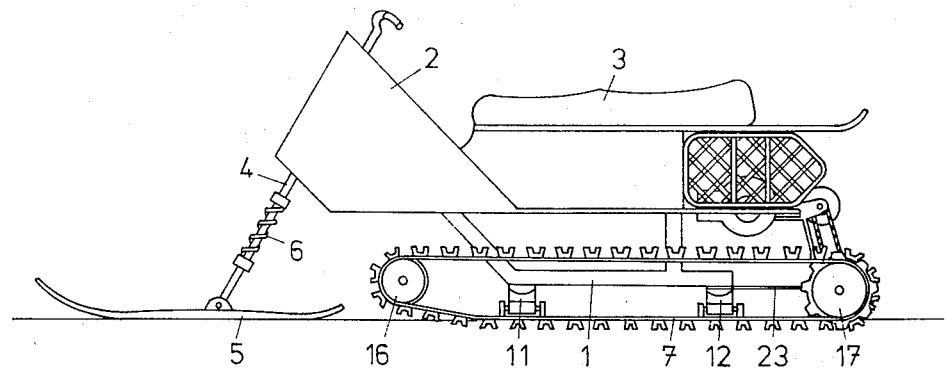

United States Patent [19]
Berguis et al.

[11] 3,766,999
[45] Oct. 23, 1973

[54] MOTOR SLEIGH
[75] Inventors: Rauno Berguis, Jyvasklyla; Risto Saivosalmi; Hannu Niskanen, both of Oulu, all of Finland
[73] Assignee: Valmet Oy, Helsinki, Finland
[22] Filed: Apr. 7, 1972
[21] Appl. No.: 242,188

[52] U.S. Cl.................. 180/5 R, 180/64 R, 305/24
[51] Int. Cl............................................ B62m 27/02
[58] Field of Search.................. 180/5 R, 9.6, 64 R; 305/24

[56]  References Cited
UNITED STATES PATENTS
3,115,206  12/1963  Renner.............................. 180/64 R
2,275,050  3/1942  Lewis................................ 180/64 R Primary Examiner—Richard J. Johnson
Attorney—Richards & Geier

[57]  ABSTRACT

A motor sleigh has a track mat which changes its direction when running over return wheels and two parallel elongated slides rigid in the plane of the track mat and extending parallel to the direction of travel. These slides cause the lower run of the track mat to be braced against the body of the motor sleigh. They carry at least those return wheels which are not involved in power transmission. The slides are braced to the body of the motor sleigh by a leaf spring fixed to the body and having both ends connected to the slides. However, the slides are free to turn about their longitudinal axis.

6 Claims, 4 Drawing Figures

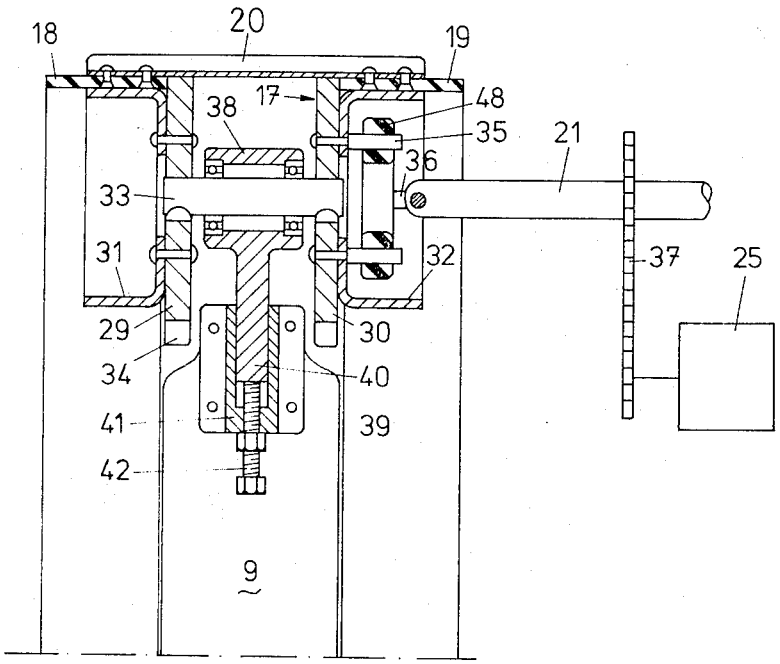
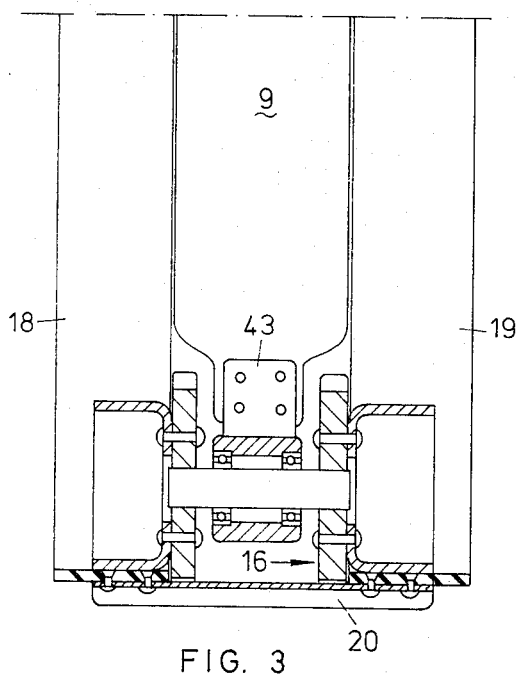
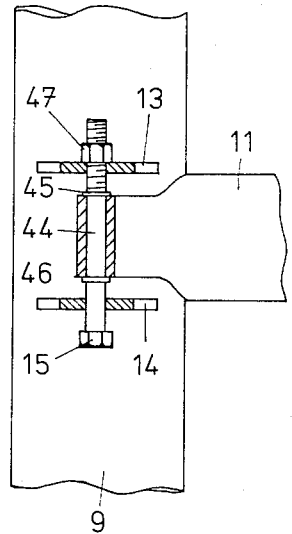
FIG. 3
FIG. 4

MOTOR SLEIGH

The present invention concerns a motor sleigh. A particular object of the invention is the supporting apparatus of the track mat of the sleigh. As a rule, in structures of prior art, the track mat is supported or braced with reference to the body by means of a plurality of individually spring-suspended track wheels. The track wheel which is first with reference to the direction of travel, the return wheel, is usually rigidly mounted on the body, for which reason it has to be positioned amply higher than the bottom level. A structure of this kind is rather expensive, and it does not in all conditions furnish the best possible bearing capacity. The individually spring-suspended wheels cause in uneven terrain unfavourable pressure peaks, owing to their point action and their inertia. Endeavours have been made to reduce these drawbacks by means of a design wherein the track mat is braced against the body by mediation of a ski-like element provided with a set of wheels and which has been rigidly attached to the body at its centre. In this design, too, the return wheels of the track mat are rigidly mounted on the body part, which results in a shorter useful length of the track pressing against the surface of travel and consequently in higher surface pressure. Furthermore, the suspension of the track at its centre is completely rigid, thus causing uneven travelling. It is further a fact that the set of wheels requires space and adds to the weight of the sleigh, and owing to the wheels the range of elastic yielding of the ski-like element remains small.

The invention furthermore concerns the spring apparatus by means of which the track mat suspension apparatus is braced against the body of the motor sleigh. A further object of the invention are the means for connecting the traction shaft and the engine with the body of the motor sleigh. In structures of prior art the engine and the primary pulley of the V-belt variator provided in its association are connected with the body of the sleigh by means of elastic elements, rubber sleeves or equivalent, in order to counteract transmission of vibrations from the engine. The secondary pulley and the transmission hence up to the traction wheels is directly connected with the body. This involves the drawback that owing to the vibratory variation of the distance between the pulleys the variator belt wears out within a short period. When the traction wheel is fixedly journalled to the body, this causes, unless expensive special means are provided, slackening of the track mat in connection with its elastic yielding, which impairs the driving characteristics. To make the traction wheel elastically yielding along with the track also implies a complex transmission mechanism.

Certain aims of the present invention are attained, and the above-mentioned drawbacks are eliminated, mainly in that the track mat is braced with reference to the body of the motor sleigh by means of a ski-like, flexible slide, along the lower side of which the track mat slides. It is furthermore advantageous if the attachment of the ski-like, flexible slide to the body of the motor sleigh is such that its forward end is free to move elastically in vertical direction. It is furthermore advantageous if the return wheel of the track mat, over which the track passes to change its direction, has been journalled on the end of the flexible, ski-like slide. In this case the return wheel need not be substantially on a level higher than that of the track bottom, and the total length of the track mat can be utilized, while the ability of the track to climb over obstacles is still preserved. This is obvious, since the return wheel is free to rise elastically, conforming to the travelling base. In this manner, furthermore, an inexpensive and simple design is obtained, which is particularly advantageous when two parallel tracks and a flexible, ski-like slide are employed.

Certain aims of the present invention are attained in that the ski-like flexible slides acting as means bracing the track mat, or the journalling bodies of the track wheel system, are braced with reference to the body of the motor sleigh by means of a transverse leaf spring attached to the slides or journalling bodies in such manner that they are free to swivel with reference to the leaf spring about an axis longitudinal to the vehicle. A bracing or attachment of this kind renders possible a uniform surface pressure distribution of the tracks under all circumstances, in addition to which the bracing is accomplished by inexpensive means. The track mats slide along the lower surface of the ski-like slides or resting against track wheels, and said slides flex and swivel, thereby adapting to the terrain exactly as common skis do.

Certain other aims of the invention are attained in that the traction shaft of the sleigh has been journalled on one end of an elongated leaf spring positioned longitudinally in a horizontal plane, the other end being attached to the body of the sleigh. The other transmission elements and the engine are also attached to the end of this leaf spring. This spring permits elastic yielding of the traction wheels, and since the leaf spring lies in a horizontal plane and is comparatively long, this elastic yielding has no appreciable effect on the tension of the track mat. The spring also efficiently counteracts the transfer of engine vibrations to the body, and the transmission from the engine to the traction wheels can be made unyielding, which implies a simple design and which is reliable in operation.

In the following an embodiment example of the invention is illustrated with the aid of a drawing.

FIG. 1 shows in elevational view a motor sleigh according to the whole of the invention.

Figure 2:
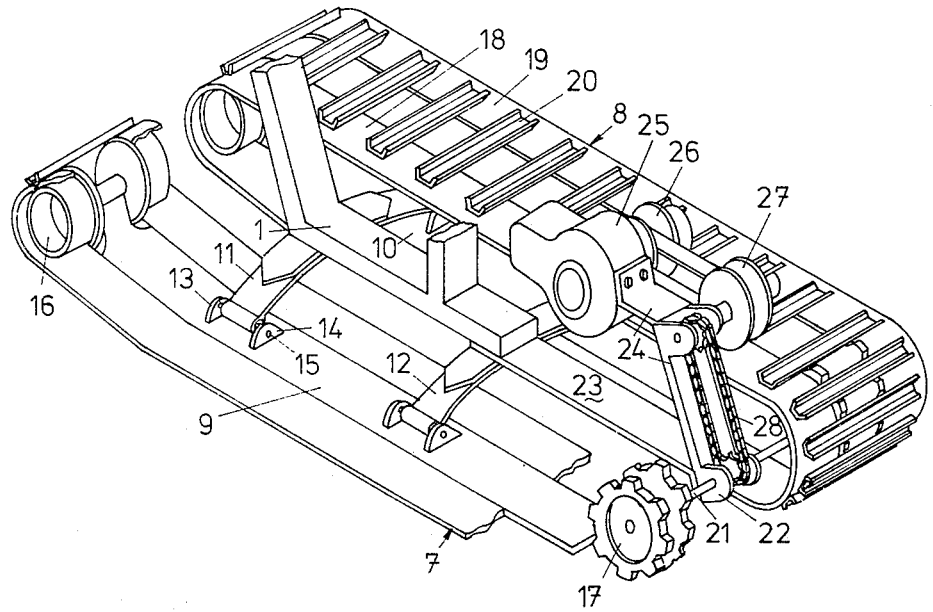

In FIG. 2 the connecting of the tracks with the body of the sleigh and the placement of the engine are presented in greater detail.

In FIG. 3 the designs of the track and of the slide ski, and the placement of the return wheel on the slide ski, are seen on a larger scale.

FIG. 4 shows the joining of the slide ski and the leaf spring supporting this slide ski.

The supporting structure of the motor sleigh consists mainly of the body 1 and of the superstructure 2 of the sleigh attached to this body, comprising the seat cushion 3 and the steering column 4. To the lower end of the steering column 4 the steering ski 5 has been pivotally attached to swivel in the vertical plane, and by turning this ski the vehicle can be steered. The steering ski 5 has been arranged to be elastically yielding in the direction of the steering column 4 against a helical spring 6. The rear portion of the vehicle gains support on the travelling surface by means of the track mats 7 and 8. These tracks 7 and 8 in their turn are braced by slides 9 and 10 constituting flexible slide skis, which have been connected with the body by means of leaf springs 11 and 12. These leaf springs 11 and 12 are at their centres rigidly attached to the body 1, and their both ends have been connected to the respective slide skis by means of trunnion flanges 13, 14 on said slide skis and by an axle 15 connecting them, which arrangement enables the slide skis to swivel about their longitudinal axis. On the front end of the ski-like slide 9, 10 the return wheel 16 of the track has been journalled. The track obtains its traction power from the rear track return wheels 17, which have been provided with teeth fitting into the interstices of the metal ribs 20 connecting the marginal parts of rubber, 18 and 19, of the track mat. These return wheels 17 have been rigidly mounted on the ends of a shaft 21, which at its centre is carried in lugs 22, which are connected to the body 1 of the vehicle by a leaf spring 23. To the end of the leaf spring 23 the body part 24 connecting the transmission elements has also been attached. On the other end of this body part 24 the engine 25 has been mounted, as well as the primary pulley 26 of the V-belt variator driven by the engine. About the middle of the body the secondary pulley 27 of the variator and a sprocket wheel on the same shaft have been journalled. The chain 28 driven by this sprocket wheel transfers the power to the traction shaft 21. The leaf spring 23, and at the same time the shaft 21, is free to yield elastically in the vertical plane and to twist in the transverse plane without thereby affecting the transmission or the tension of the tracks. This causes even more efficient damping of the vibration caused by the engine without causing any significant movement of the transmission elements with reference to each other. The traction shaft may be connected with the traction wheels, instead of the rigid connection presented in this particular example, also by means of universal joints in case the traction wheels are journalled in association with the slide skis 9 and 10. The forward end of the engin 25 has no specific support of its own. Rigid beams of the body part 24 (FIG. 2) constitute the only firm supporting structure by which the engine 25 with its transmission means 21, 26, 27, 28 is attached to the rear end of the spring 23. Since the driven shaft 21 of the traction - providing return wheels is fixedly journalled in the part 24 by lugs 22, the bending of the spring 23 has no objectionable effect on the operation of the transmission.

In FIG. 3 the designs of the track, the ski-like slide constituting the slide ski and the return wheels are seen in closer detail. In this design solution, contrary to that shown in FIG. 2, the rear return wheel 17 has also been connected with the ski-like slide 9 or arranged to constitute its continuation. The return wheel 17 is mainly composed of two disks 29 and 30 with toothed periphery, of cylinders 31 and 32 attached to these, and of a shaft 33 connecting the disks. The disks 29 and 30 are so spaced with reference to each other that they fit into the space between the track bands 18 and 19 and guide these to maintain their direction. The tooth rims 34 of the disks 29 and 30 have been made to fit into the interstices between the ribs 20, and they transfer the movement to the track mat. The track mat has been constructed so that the ribs 20 do not extend quite up to the outer edges of the track bands 18 and 19 made of resilient material, instead of which also in the transverse direction elastic marginal parts are left, which adapt to the shape of the terrain and cause no sharp step in the snow, which would detract from the bearing capacity of the mat. Power is transferred to this wheel over a universal joint 48 of rubber. The rubber ring of the universal joint 48 is on one hand in sliding engagement with pins 35 on the disk 30 and on the other hand fixedly mounted on pins 36 projecting from the shaft 21, so that the angle between the shaft 21 and the wheel 17 and their axial distance may vary within suitable limits. The engine 25 drives by means of a suitable transmission 37 the shaft 21, to the other end of which the other track assembly has been connected in equivalent manner. The shaft 33 is carried on the slide ski 9 by the bearing body 38 and the adjustment body 39. By moving the guide rod 40 of the bearing body in its guide bore 41 in the adjustment body by the aid of adjustment screws 42, the return wheel 17 can be moved in the direction of the ski-like slide 9 and thereby the tension of the track can be regulated. The adjustment body has been fixedly mounted on the slide 9. In equivalent manner, the front return wheel 16 consists of disks and cylinders and of a shaft connecting these, which has been carried in a bearing box 43 immovably attached to the ski.

FIG. 4 shows the attachment of the slide 9 to the leaf spring in a construction wherein the rear return wheel is attached to the body of the sleigh, in which case the tension of the track is adjusted by displacing the ski, and which displacement thus is with reference to the leaf spring 11. To the slide 9 two trunnion flanges 13 and 14 have been affixed, which are connected by a screw 15. The end of the leaf spring 11 forms an eye 44, which is free to swivel about the screw 15. Lock rings 45 and 46 fix the leaf spring 11 in the longitudinal direction of the screw 15. The flange 13 has been threaded, as has the end of the screw 15. It is now possible by turning the screw 15 to shift the position of the leaf spring 11 with reference to the slide 9 and thereby to tighten the track band. Upon completed adjustment the screw 15 is secured in its position with the nut 47.

In FIGS. 1 and 2 two transverse leaf springs 11, 12 have been shown, one behind the other. In some instances, in particular in sleighs which have a light weight, merely one leaf spring may be used, which is placed about the middle of the sleigh.

We claim:

1. A motor sleigh comprising a body, a leaf spring extending transversely to the body, a track mat with return wheels, a ski-like flexible slide bracing the track mat, the track mat sliding along the lower side of said slide, a transverse leaf spring, a joint connecting said slide with said leaf spring and comprising two flanges connected to said slide, a shaft connecting said flanges, the eye of the leaf spring being journalled and turnable about said shaft, lock rings engaging said leaf spring to keep it immovable in the longitudinal direction, said shaft having a threaded end engaging a threaded hole of one of said flanges, whereby said shaft is movable in the longitudinal direction, said transverse leaf spring being connected at its center to said body and having an end connected to said slide, said transverse leaf spring bracing said slide against said body, said slide being free to swivel relatively to said leaf spring about an axis extending in the direction of travel.

2. A motor sleigh comprising a body with carriage structure and driver's seat; a track mat; return wheels, running over which the track mat changes its direction; two parallel ski-like, elongated slides having a breadth substantially greater than their thickness and flexible in the vertical direction and about their longitudinal axis, but rigid in the plane of the track mat, and which are parallel in their longitudinal direction with the direction of travel of the motor sleigh and by which the lower run of the track mat is braced against the body of the motor sleigh, at least those of said return wheels which are not involved in power transmission being attached to the ends of said slides; bracing means for bracing said slides with reference to the body of the motor sleigh, the bracing means comprising a leaf spring transversal to the direction of travel of the motor sleigh and lying substantially in a horizontal plane, said spring being fixed to the body of the motor sleigh in its central region; and means for connecting both ends of said leaf spring each to one of said slides, the last-mentioned means being such that said slides are free to turn about their longitudinal axis.

3. A motor sleigh according to claim 2, wherein the ski-like slide has been bent gently upwardly some distance before the front return wheel.

4. A motor sleigh according to claim 2, wherein the return wheels have been attached to the ends of the ski-like, flexible slide, the tension of the track mat being adjustable by displacing one of the two return wheels with reference to the ski-like slide.

5. A motor sleigh according to claim 2, wherein the track mat consists of two bands made of elastic material and of transverse ribs of metal connecting said bands, which ribs slide along the bottom of the ski-like, flexible slide, while the edges of the bands abut on the edges of the ski-like slide and thus maintaining the track mat in its direction, and wherein the return wheel consists of two round, toothed disks, which abut on the edges of said bands maintaining them in position, and of two cylindrical parts, which rest against the inner surface of the bands thus causing smoother reversal of the track mat.

6. A motor sleigh, comprising a body, an engine, power transmission elements, a body part carrying the engine and transmission elements and a traction shaft, wherein the traction shaft and the body part supporting the engine and the tranmission elements have been mounted on one end of an elongated leaf spring lying longitudinally in a horizontal plane, the other end of said leaf spring being affixed to the body.

* * * * *